E. C. LITCHFIELD.
COMPOSITE METAL AXLE.
APPLICATION FILED OCT. 19, 1912.
1,170,172.
Patented Feb. 1, 1916.
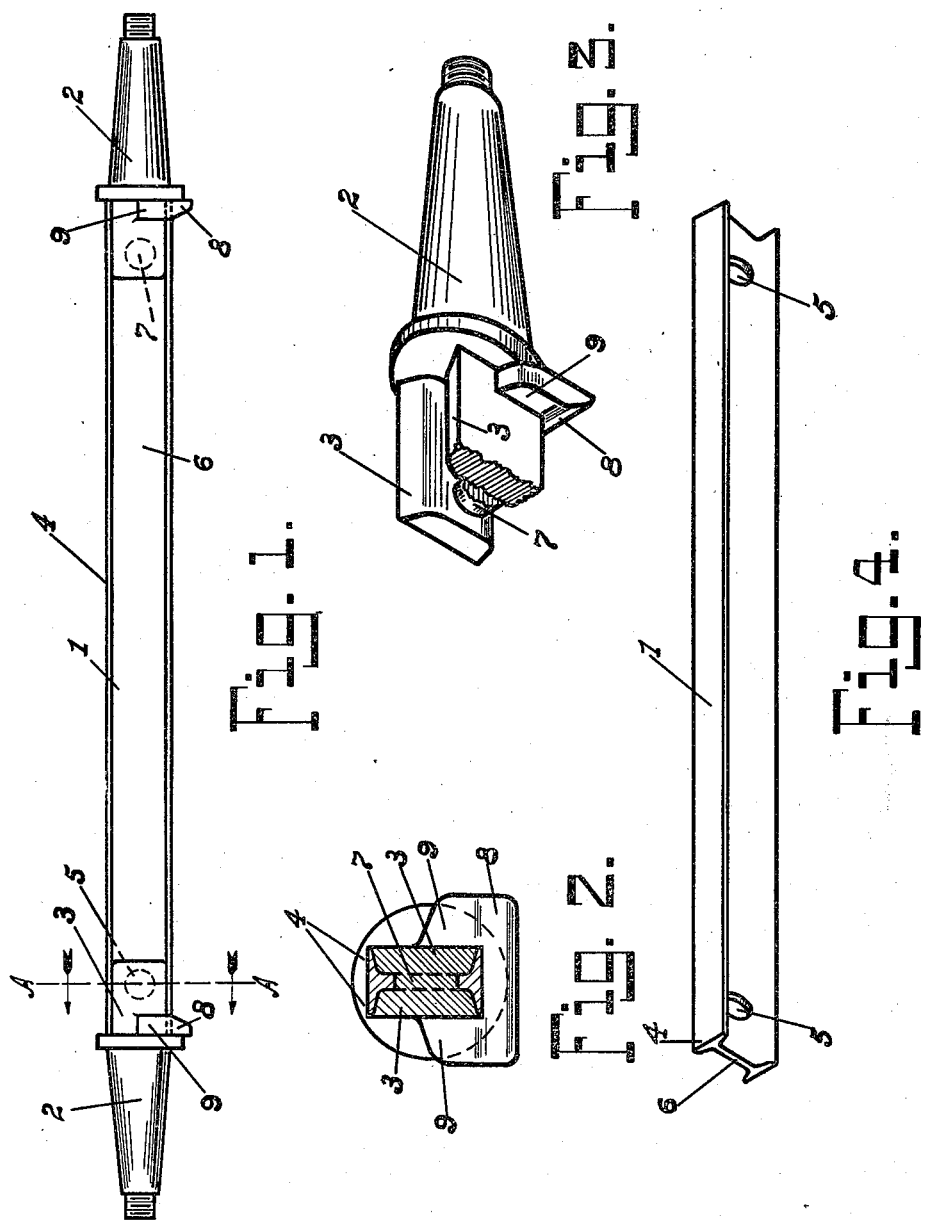
WITNESSES
INVENTOR
E. C. Litchfield
BY
ATTORNEYS.

UNITED STATES PATENT OFFICE.

EDGAR C. LITCHFIELD, OF WATERLOO, IOWA.

COMPOSITE METAL AXLE.

1,170,172. Specification of Letters Patent. Patented Feb. 1, 1916.

Application filed October 19, 1912. Serial No. 726,653.

*To all whom it may concern:*

Be it known that I, EDGAR C. LITCHFIELD, a citizen of the United States, residing at Waterloo, county of Blackhawk, State of Iowa, have invented a certain new and useful Improvement in Composite Metal Axles, and declare the following to be a full, clear, and exact description of the same, such as will enable others skilled in the art to which it pertains to make and use the same, reference being had to the accompanying drawings, which form a part of this specification.

My invention has for its object to produce a strong, simple, durable and inexpensive axle for vehicles of various kinds where the duty is heavy.

For heavy farm wagons, farm trucks or trucks for mounting engines, well machinery, concrete mixers or other apparatus where the axles have to carry a great weight, the ordinary wooden axle is insufficient and therefore various methods have been tried for producing, at not too great a cost, a satisfactory axle to take the place of the wooden axle. Of course axles may be forged, cast of steel or built up in various ways where the cost is not important, but axles for the service to which I have referred, must be kept low in cost and must have the necessary qualities to give efficient journal-bearing surfaces. For the body of such an axle strong, tough, structural iron or steel may be used to advantage, but this makes it necessary to solve the problem of connecting the journals or skein members. It is recognized that gray iron castings make very efficient journals and therefore it has been attempted with more or less success to bolt or rivet gray iron journal members upon the body members of various sorts. This method of constructing an axle requires that the parts be carefully finished and fitted together in order to secure tight joints, and even with perfect workmanship in the joints they will not remain tight because the vibration to which the axle is subjected is constantly affecting the joints so as to wear and loosen them; therefore axles made in this way are comparatively expensive and have no durability.

I have discovered that by selecting a structural iron body member of a proper cross section and casting on the ends thereof properly proportioned journal members, the defects incident to axles assembled in the way I have described are entirely overcome and the cost is reduced to a minimum.

Viewed in one of its aspects, my invention may therefore be regarded as having for its object to produce a simple, inexpensive, strong and durable composite metal axle.

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is a side elevation of an axle constructed and arranged in accordance with a preferred form of my invention; Fig. 2 is a section on an enlarged scale on line A—A of Fig. 1, looking in the direction of the arrows; Fig. 3 is a perspective view on about the same scale as Fig. 2 of one of the skein members, the end of the body member which it engages being omitted and portions of the attaching parts being broken away; and Fig. 4 is a perspective view of the body member of the axle on about the same scale as Fig. 1.

Referring to the drawing, 1 represents a piece of structural iron or steel having on its ends journals or skeins, 2, the parts being so proportioned that the whole makes a complete axle. The body may be made of any desired cross section without departing from my invention as viewed in some of its aspects. However, as will herein-after appear, the I-beam possesses distinct advantages when it comes to adding the journals at the ends of the body member and therefore, since the I-beam is a simple structural shape which can be obtained in quantities with uniformity of strength, toughness and other qualities, I consider the I-beam the best form of structural steel or iron from which to make the body member.

In making the axle the body member, having been cut to the proper length, is inserted at one end into a proper mold into which molten metal is poured to form the journal and simultaneously unite it with the body member. I so shape the mold that from the journal or skein member proper there extend along the adjacent ends of the body member integral blocks or cheek pieces, 3, which lie in and preferably fill the channels in the sides of the I-beam. The molten metal is poured into the mold directly at the end of the I-beam so that substantially all of the hot metal which goes to make up the journal member flows exerts a heating influence on the metal of the I-beam, and a thorough fusing or welding together of the two metals takes place. As the molten metal solidifies and the casting sets, the blocks or cheek pieces, 3, tend to move toward each other, and, because the flanges, 4, of the I-beam are thinnest at the outer edges and become gradually thicker toward the center, perfect contact and union is maintained between the metal of the body member and of the journal member. When the axle is put into service the blocks or cheek pieces are supported from above and below by the flanges of the I-beam so that the cast metal parts are effectively reinforced by the tougher material of the I-beam. Since the blocks or cheek plates fit within the channels of the I-beam, there can be no displacement of the journal in a vertical direction, assuming the web of the I-beam to be vertical, this result being obtained without requiring the casting to extend entirely around the end of the body member as would be necessary in the case of a body member having no depressions, channels or reëntrant angles at the sides; thus reducing the weight of the casting to a minimum and at the same time giving much greater strength than would be present in a construction wherein the downward pull of gravity on the load carried by the axle is resisted solely by the tensile strength of the gray iron or other metal of which the casting might be made.

In order to insure a perfect union between the casting and the body member and increase the strength of the joint under stresses in the vertical direction, an opening, 5, may be drilled or punched through the web, 6, of the I-beam near each end thereof; the result being that the molten metal which flows into the channels in the I-beam to form the blocks or cheek pieces, 3, continues through the opening so as to form a continuous tie or connecting piece, 7, extending from one block or cheek piece to the other and being integral with both blocks or cheek pieces. The contraction of the connecting piece, 7, in a lengthwise direction, serves to draw the blocks or cheek pieces into and hold them in intimate contact with the sides of the body member; thus producing a joint which offers great resistance to vertical forces or stresses. This casting of one member of the axle through the other I therefore regard of great importance and as the preferred form of my invention. As a further elaboration, the blocks or cheek pieces, the casting as a whole and the entire axle itself may be strengthened by the addition of a depending truss, 8, extending across beneath the bottom of the body member and having upwardly projecting arms, 9, which grow out from the side of the blocks or cheek pieces.

I have described in detail the completion of only one end of the axle, but it will of course be understood the other end will be completed in the same way.

While I have illustrated and described with particularity only a single preferred form of my invention, I do not desire to be limited to the structural details thus illustrated and described; but intend to cover all forms and arrangements which come within the terms employed in the definitions of my invention constituting the appended claims. Furthermore, since the body of the axle may be made either of wrought iron or of steel, I desire to have it understood that where I use the term steel I do not intend to exclude wrought iron, but to include it.

I claim:

1. In combination, a supporting member of steel having a web provided with flanges, said web having an opening therethrough, and a bearing member having two separated blocks cast on opposite sides of the web and united by a part extending through said opening, at least one of said blocks engaging with said flanges.

2. In combination, a supporting member having a recess in the side thereof and an opening extending therethrough from the recess, and a bearing member having integral blocks one of which lies in the recess and the other of which engages the opposite side of the supporting member cast in place and united by an integral portion extending through said opening.

3. In combination, a supporting member having recesses in its sides and an opening extending through the same and connecting the recesses together, and a bearing member cast upon the supporting member and having portions lying within said recesses and connected together by an integral piece extending through said opening.

4. In combination, an I-beam having an opening through its web, and a bearing member cast upon the I-beam and having parts fitting between the flanges thereof and united by an integral part extending through said opening.

5. An axle comprising a body member having an opening therethrough near the end thereof, a journal member abutting against said end of the body member and having an integral attaching device consisting of separated blocks cast on opposite sides of the body member and united by an integral part extending through said opening.

6. An axle comprising a body member in the form of an I-beam having an opening through the web near one end thereof, and a journal cast upon said end of the body member and having an integral attaching device comprising separate blocks lying between the flanges of the I-beam and united by an integral connecting piece extending through said opening.

7. An axle comprising a body member having an opening therethrough near one end thereof, a journal, and attaching means for the journal comprising two separate parts lying on opposite sides of the axle and tied together by a connecting piece extending through said opening, said journal and attaching means being formed by casting them upon the body member.

8. An axle comprising a body member in the form of an I-beam having an opening extending through the web near one end thereof, and a journal member having integral attaching means in the form of a jaw fitting against the web and between the flanges of the I-beam and a connecting piece for the two members of the jaw extending through said opening, the journal with its attaching means being in the shape of a single casting formed on the end of the I-beam.

9. An axle comprising a body member having recesses in its opposed sides and an opening extending therethrough from one recess to the other, a journal member abutting against the end of the body member, two independent arms integral with the journal member fitting into said recesses, and a connecting piece for said arms extending through said opening, the body member and the journal member being united by casting the journal member with its arms and their connecting piece upon the body member.

In testimony whereof, I sign this specification in the presence of two witnesses.

EDGAR C. LITCHFIELD.

Witnesses:
L. L. McCarty,
E. F. O'Connor.

Copies of this patent may be obtained for five cents each, by addressing the "Commissioner of Patents, Washington, D. C."